(12) United States Patent
Nagasaka et al.

(10) Patent No.: US 11,130,540 B2
(45) Date of Patent: Sep. 28, 2021

(54) SADDLE TYPE VEHICLE

(71) Applicant: KAWASAKI JUKOGYO KABUSHIKI KAISHA, Kobe (JP)

(72) Inventors: Kazuya Nagasaka, Kakogawa (JP); Takenori Terada, Kobe (JP); Hiroshi Ishii, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 94 days.

(21) Appl. No.: 16/437,198

(22) Filed: Jun. 11, 2019

(65) Prior Publication Data

US 2019/0382068 A1 Dec. 19, 2019

(30) Foreign Application Priority Data

Jun. 13, 2018 (JP) .............................. JP2018-112541

(51) Int. Cl.
| | |
|---|---|
| *B62K 5/08* | (2006.01) |
| *B62K 5/10* | (2013.01) |
| *B62D 9/02* | (2006.01) |
| *B62D 9/04* | (2006.01) |
| *B62K 5/027* | (2013.01) |
| *B62K 5/05* | (2013.01) |

(Continued)

(52) U.S. Cl.
CPC .............. *B62K 5/08* (2013.01); *B60G 21/007* (2013.01); *B62K 5/027* (2013.01); *B62K 5/05* (2013.01); *B62K 5/10* (2013.01); *B60G 2300/45* (2013.01); *B62D 61/065* (2013.01); *B62K 2005/001* (2013.01)

(58) Field of Classification Search
CPC . B62K 5/08; B62K 5/027; B62K 5/05; B62K 5/00; B62K 5/10; B62K 5/01; B62K 2005/001; B62D 9/02; B62D 9/04; B62D 61/065; B62D 61/06; B60G 2300/45; B60G 2300/122; B60G 21/007; B60Y 2200/12; B60Y 2200/122
USPC ..................... 180/210; 280/124.103, 62, 267
See application file for complete search history.

(56) References Cited

U.S. PATENT DOCUMENTS

| | | | |
|---|---|---|---|
| 10,625,808 B2* | 4/2020 | Mitsuoka | ................. B62K 5/05 |
| 2015/0274205 A1* | 10/2015 | Murakami | ........... B62D 5/0457 |
| | | | 280/89 |

(Continued)

FOREIGN PATENT DOCUMENTS

| | | |
|---|---|---|
| EP | 3056418 | 8/2016 |
| JP | 6170086 | 7/2017 |

*Primary Examiner* — Keith J Frisby
(74) *Attorney, Agent, or Firm* — Fay Kaplun & Marcin, LLP

(57) ABSTRACT

A saddle type vehicle includes two front wheels, a left front wheel supporting member and a right front wheel supporting member which are turned around a left front wheel turning axis and a right front wheel turning axis respectively, and an upper lean arm and a lower lean arm which are rotated around an axis perpendicular to a vehicle width direction. The upper arm is connected to the left and right members via first and second connecting parts. The lower arm is connected to the left and right members via third and fourth connecting parts. The first and third parts are provided in the left front wheel turning axis. The second and fourth parts are provided in the right front wheel turning axis. A distance between the first and second parts is equal to the distance between the third and fourth parts.

6 Claims, 10 Drawing Sheets

(51) Int. Cl.
*B60G 21/00* (2006.01)
*B62D 6/06* (2006.01)
*B62K 5/00* (2013.01)
*B62D 61/06* (2006.01)

(56) References Cited

U.S. PATENT DOCUMENTS

2016/0229480 A1    8/2016  Mori
2019/0009630 A1*  1/2019  Raffaelli .................. B62K 5/08
2019/0300095 A1*  10/2019  Raffaelli .................. B62K 5/08

* cited by examiner

SADDLE TYPE VEHICLE

TECHNICAL FIELD

The present invention relates to a saddle type vehicle having two front wheels.

BACKGROUND ART

A saddle type vehicle having a pair of front wheels in left and right has been conventionally known.

Patent Document 1 (Japanese Patent No. 6170086) discloses this kind of vehicle.

A swing type vehicle in Patent Document 1 includes a pair of arm members supported on the vehicle body on inner sides for supporting the left and right front wheels in a steerable manner on outer side, left and right shock absorber units which bear loads on the left and right front wheels respectively, and left and right tie rods which are connected to a steering link mechanism.

SUMMARY OF THE INVENTION

In a saddle type vehicle having two front wheels shown in Patent Document 1, it has been desired to simplify a structure and reduce the weight of a vehicle while realizing lean and turning.

The present invention relates to a saddle type vehicle capable of realizing lean and turning with a simple structure.

According to an aspect of the present invention, a saddle type vehicle with the following configuration is provided. That is, the saddle type vehicle includes a first steering wheel, a second steering wheel, a first steering wheel supporting member, a second steering wheel supporting member, a first lean arm, a second lean arm, a steering spindle, a first knuckle member, a second knuckle member, and a steering link mechanism. The first steering wheel is rotatable. The second steering wheel is rotatable and arranged opposite to the first steering wheel in a vehicle width direction. The first steering wheel supporting member supports the first steering wheel. The second steering wheel supporting member supports the second steering wheel. In the first lean arm, its center part is supported by a vehicle body, one side in the vehicle width direction is connected to the first steering wheel supporting member via a first connecting part, and the other side is connected to the second steering wheel supporting member via a second connecting part. The first lean arm is rotated around an axis perpendicular to the vehicle width direction. In the second lean arm, its center part is supported by the vehicle body at a height different from that in the center part of the first lean arm, one side in the vehicle width direction is connected to the first steering wheel supporting member via a third connecting part, and the other side is connected to the second steering wheel supporting member via a fourth connecting part. The second lean arm is rotated around an axis perpendicular to the vehicle width direction.

The steering spindle is supported by the vehicle body so as to be turned left and right around a steering turning axis. The first knuckle member can be turned left and right around a first turning axis for connecting the first connecting part and the third connecting part. The first knuckle member is pushed and pulled to the vehicle width direction, and thereby the first steering wheel is turned left and right around the first turning axis. The second knuckle member can be turned left and right around a second turning axis for connecting the second connecting part and the fourth connecting part. The second knuckle member is pushed and pulled to the vehicle width direction, and thereby the second steering wheel is turned left and right around the second turning axis. The steering link mechanism pushes and pulls the first knuckle member and the second knuckle member to the vehicle width direction in conjunction with left and right turning of the steering spindle. A distance between the first connecting part and the second connecting part is equal to the distance between the third connecting part and the fourth connecting part.

Accordingly, with combination of a steering link mechanism and lean arms, lean and steering for interlocking a pair of steering wheels can be realized with a simple mechanism.

According to the present invention, a saddle type vehicle capable of realizing lean and turning with a simple structure can be provided.

EMBODIMENT FOR CARRYING OUT THE INVENTION

Figure 1:
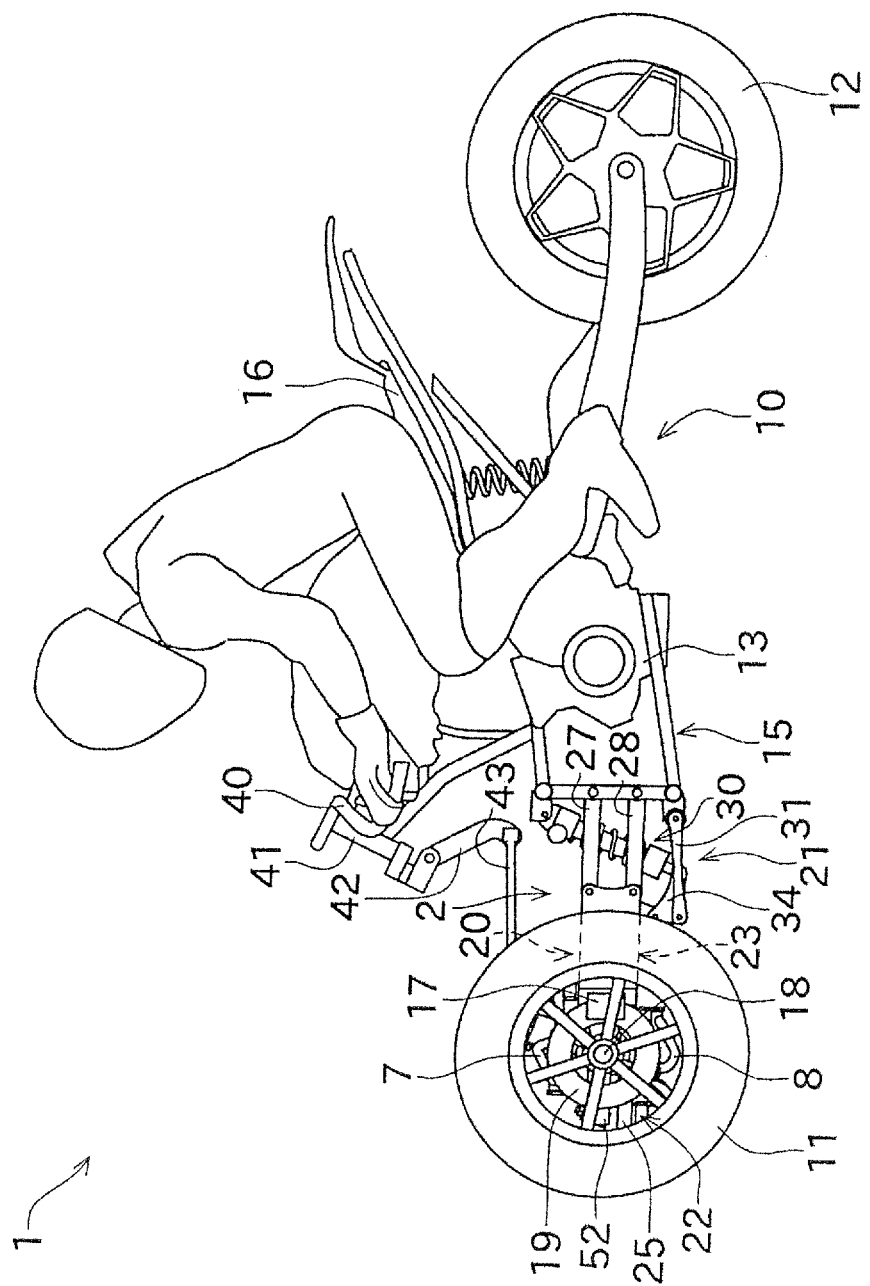
FIG. 1 is a schematic side view showing a configuration of a saddle type vehicle according to a first embodiment of the present invention.
Figure 2:
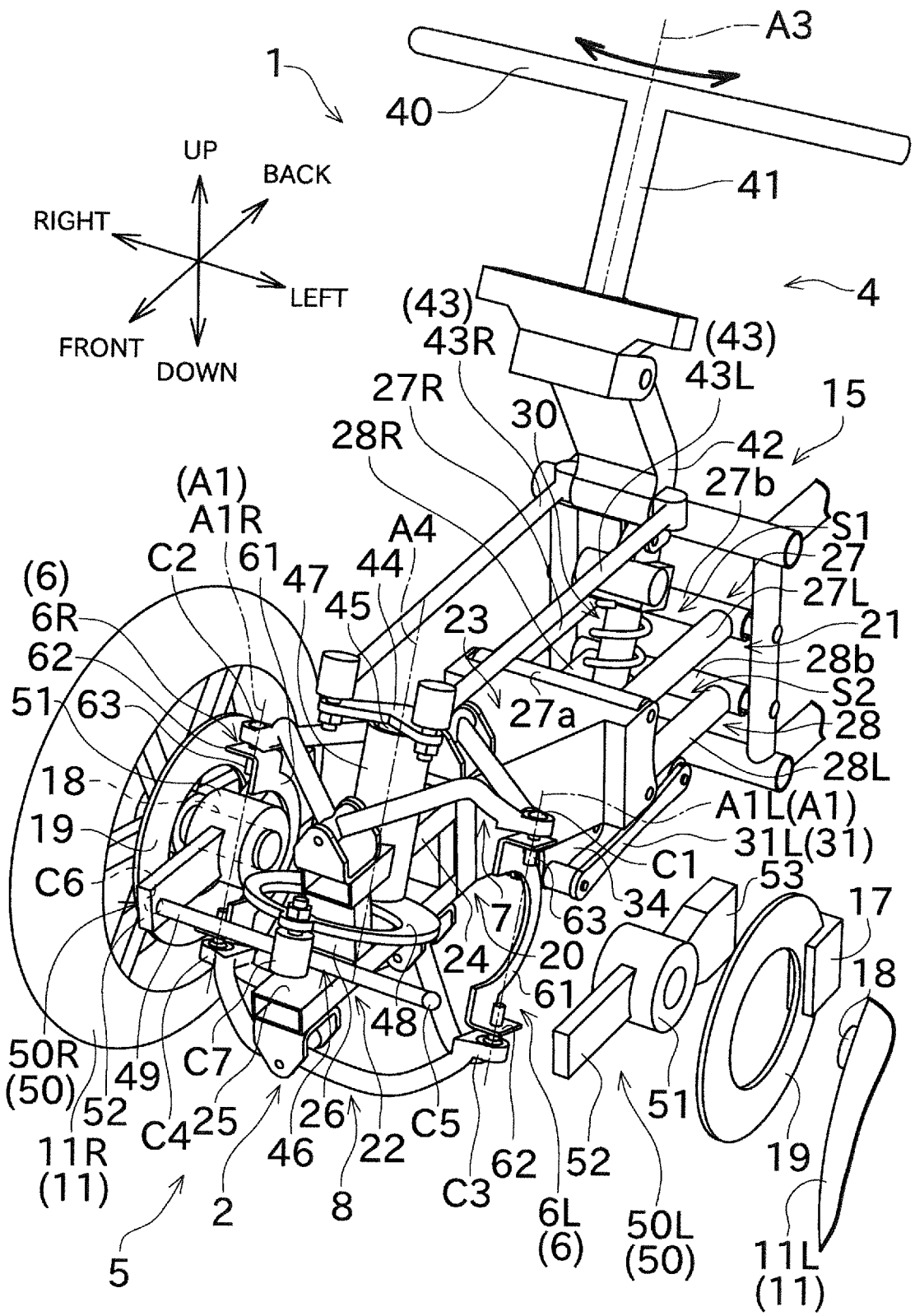
FIG. 2 is a partial perspective view showing a front wheel supporting structure of the saddle type vehicle.
Figure 3:
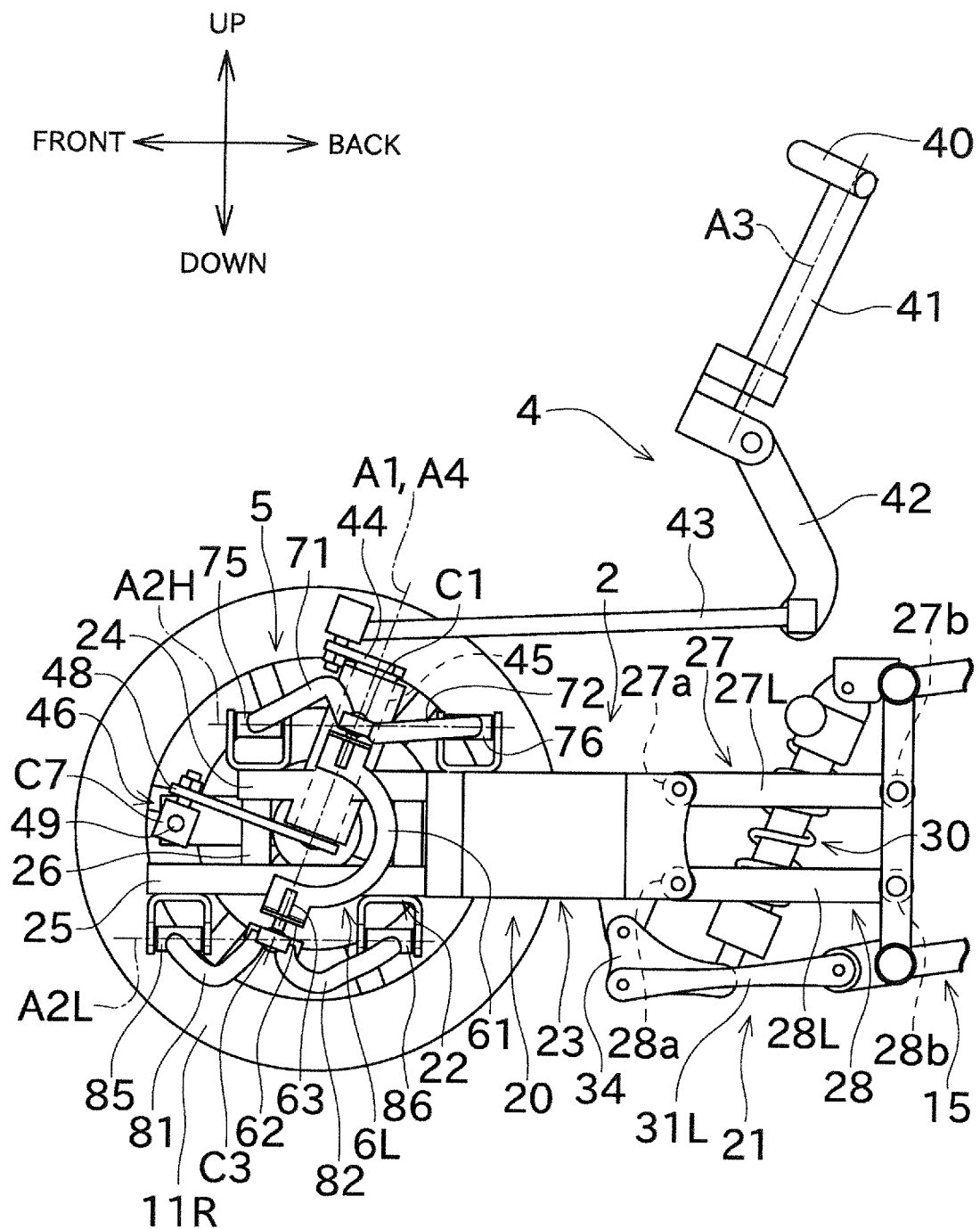
FIG. 3 is a partial side view showing the front wheel supporting structure.
Figure 4:
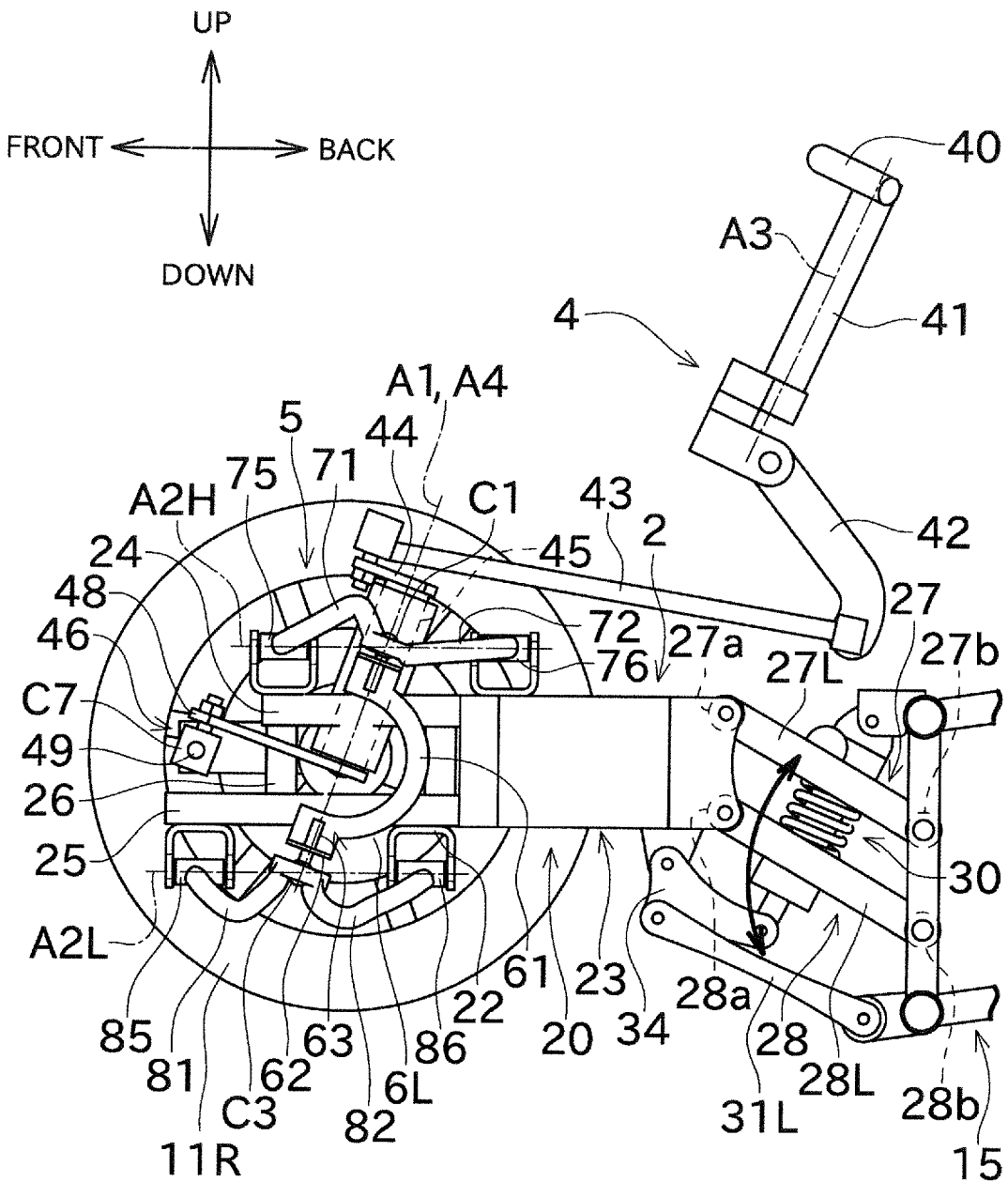
FIG. 4 is a partial side view showing a state in which a front supporting member is swung upward with respect to a vehicle body frame from the state shown in FIG. 3.
Figure 5:
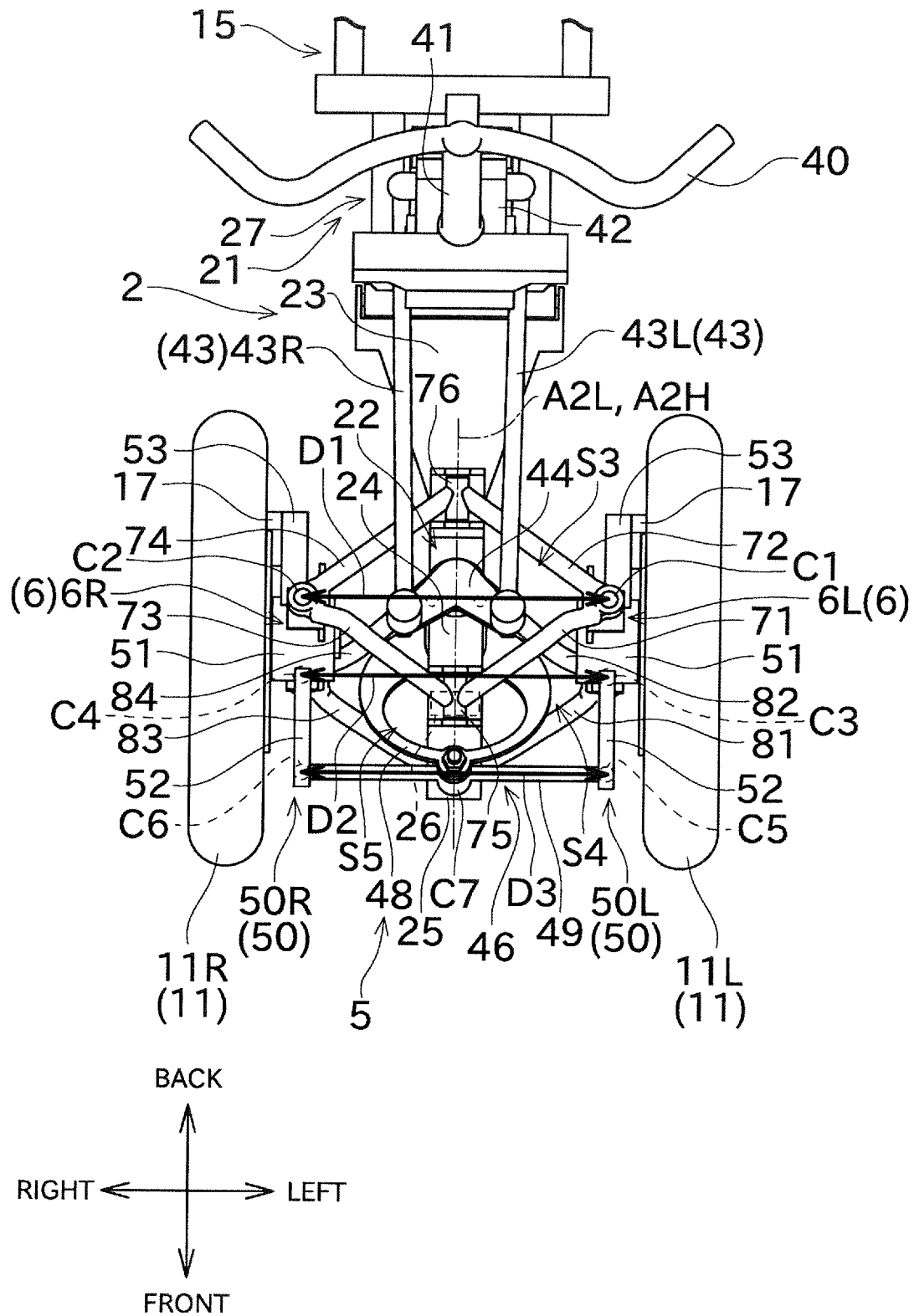
FIG. 5 is a partial plan view showing a front wheel supporting structure.

Next, an embodiment of the present invention will be described with reference to drawings. FIG. 1 is a schematic side view showing a configuration of a saddle type vehicle 1 according to a first embodiment of the present invention. FIG. 2 is a partial perspective view showing a front wheel supporting structure 5 of the saddle type vehicle 1. FIG. 3 is a partial side view showing the front wheel supporting structure 5. FIG. 4 is a partial side view showing a state in which a front supporting member 20 is swung upward with respect to a vehicle body frame 15 from the state shown in FIG. 3. FIG. 5 is a partial plan view showing the front wheel supporting structure 5.

In the following description, front-back, up-down and left-right directions are defined that directions as seen from a driver who rides on the saddle type vehicle 1. The left-right direction may also be defined as a vehicle width direction of the saddle type vehicle 1.

The saddle type vehicle 1 of the first embodiment shown in FIG. 1 and FIG. 2 includes a vehicle body 10, front wheels 11, and a rear wheel 12. The driver drives the saddle type vehicle 1 while straddling the vehicle body 10. Two front wheels 11 are arranged in pairs in left and right. One rear wheel 12 is arranged.

The vehicle body 10 supports a drive source for driving the saddle type vehicle 1. In this embodiment, an engine 13 shown in FIG. 1 is used as the drive source. The engine 13 functions as a power unit for driving the rear wheel 12 that is a driving wheel. The engine 13 is configured as a gasoline engine, for example. A driving force generated in the engine 13 is shifted by a transmission gear (not shown) and transmitted to the rear wheel 12 via a drive chain (not shown). However, instead of the engine 13, for example, an electric motor may be used as the drive source.

The vehicle body 10 includes the vehicle body frame 15 and a front supporting unit 2. A seat 16 on which the driver sits is provided above the vehicle body 10. A steering handle 40 operated by the driver is provided at a front upper portion of the vehicle body 10.

The vehicle body frame 15 is made of a strength component, for example, a metal pipe, that is a framework for supporting the engine 13, etc. The front supporting unit 2 is connected to a front part of the vehicle body frame 15.

The front supporting unit 2 is arranged in a front part of the vehicle body 10 (arranged forward of the vehicle body frame 15). The front supporting unit 2 includes a front supporting member 20 and an up-down motion link mechanism 21.

The front supporting member 20 is arranged in a center of the vehicle width direction (left-right direction) as shown in FIG. 2. The front supporting member 20 is mounted with respect to the vehicle body frame 15, so as to move up and down in arc motion.

The front supporting member 20 includes a front arm (tip) 22 and a base part 23.

The front arm 22 is arranged between the pair of front wheels 11, and positioned forward of the base part 23. The front arm 22 includes an upper tip arm 24, a lower tip arm 25, and a joint part 26, as shown in FIG. 3, for example.

The upper tip arm 24 and the lower tip arm 25 are made of square pipe shaped members, for example. The upper tip arm 24 and the lower tip arm 25 extend in a substantially horizontal front-back direction. The lower tip arm 25 is positioned below the upper tip arm 24. A rear end of the upper tip arm 24 and a rear end of the lower tip arm 25 are fixed to a front end face of the base part 23 by welding or the like, respectively.

The upper tip arm 24 and the lower tip arm 25 are arranged in a center in the left-right direction of the vehicle body 10, and arranged side by side in the up-down direction. The upper tip arm 24 and the lower tip arm 25 are arranged parallel to each other.

The lower tip arm 25 is formed longer than the upper tip arm 24. Therefore, a front end (tip) of the lower tip arm 25 is positioned forward of the front end (tip) of the upper tip arm 24.

The joint part 26 is configured as a rod-like member extending in the up-down direction. The joint part 26 is provided between the upper tip arm 24 and the lower tip arm 25. The joint part 26 connects an intermediate portion in the front-back direction of the lower tip arm 25 and the front end of the upper tip arm 24.

The base part 23 is arranged backward of the upper tip arm 24 and the lower tip arm 25. The base part 23 is formed so as to extend in the front-back direction. As described above, the upper tip arm 24 and the lower tip arm 25 constituting the front arm 22 are fixed to the front end of the base part 23. The up-down motion link mechanism 21 is connected to the rear end of the base part 23.

The up-down motion link mechanism 21 connects the front supporting member 20 and the vehicle body frame 15. As shown in FIG. 2, the up-down motion link mechanism 21 includes an upper link member 27 and a lower link member 28. The upper link member 27 and the lower link member 28 are arranged side by side in the up-down direction.

The upper link member 27 has a rectangular frame shape as seen in the up-down direction. The upper link member 27 includes shaft parts 27a and 27b which are arranged in pairs in front and hack, and link arms 27L and 27R which are arranged in pairs in left and right.

Each of the shaft parts 27a, 27b is configured as an elongated member, and arranged so as to extend horizontally in the left-right direction. The pair of shaft parts 27a, 27h is spaced in the front-back direction. The front shaft part 27a is mounted at the rear end of the base part 23 so as to be rotated around a shaft in a horizontal direction. The rear shaft part 27b is mounted to the vehicle body frame 15 so as to be rotated around the shaft in the horizontal direction.

Each of the link arms 27L, 27R is elongated and arranged so as to extend in the front-back direction. The pair of link arms 27L, 27R is spaced in the left-right direction. Each front end of the link arms 27L, 27R is fixed to the front shaft part 27a, and each rear end of the link arms 27L, 27R is fixed to the rear shaft part 27b.

As shown in FIG. 2 and FIG. 3, the lower link member 28 includes a pair of shaft parts 28a and 28b in front and back, and a pair of link arms 28L and 28R in left and right. Since the lower link member 28 has substantially same configuration as the upper link member 27, description will be omitted.

Each length of the four link arms 27L, 27R, 28L, 28R of the up-down motion link mechanism 21 is equal to one another. The up-down motion link mechanism 21 constitutes a parallel link mechanism. Therefore, the front supporting member 20 can be moved up and down in arc motion with respect to the vehicle body frame 15, as shown by a thick arrow in FIG. 4 while maintaining an orientation with respect to the vehicle body frame 15. However, each up-down length of the link arms 27L, 27R, 28L, 28R may be different from one another.

As shown in FIG. 2, the upper link member 27 has a rectangular frame shape, and thereby a rectangular hollow space S1 is formed in a portion sandwiched by the left and right link arms 27L, 27R, inside the upper link member 27. Similarly, a rectangular hollow space S2 is formed in a portion sandwiched by the left and right link arms 28L, 28R, inside the lower link member 28.

The vehicle body frame 15 and the front supporting member 20 are connected to each other via a suspension mechanism constituted by a suspension unit 30, an interlocking arm 31, and a suspension link 34.

The suspension unit 30 functions as a shock absorber to mitigate shock so that unevenness of a road surface is not transmitted to the vehicle body 10. The suspension unit 30 absorbs shock and vibration from the road surface. The suspension unit 30 can be configured, for example, as a device in which a spring and a damper are integrated therewith.

In this embodiment, the suspension unit 30 is an elongated component, and its length is stretchable. The suspension unit 30 is provided generally extending in the up-down direction (inclinedly in a front-low and back-high state) so as to pass between the link arms 27L and 27R of the upper link member 27 provided in the up-down motion link mechanism 21, and pass between the link arms 28L and 28R of the lower link member 28 provided in the up-down motion link mechanism 21. The extending direction of the suspension unit 30 has a vertical component. An upper end of the suspension unit 30 is rotatably connected to a front upper portion of the vehicle body frame 15, and a lower end of the suspension unit 30 is rotatably connected to a rear end of the suspension link 34.

As such, the suspension unit 30 is arranged so as to pass through the hollow spaces S1, S2 which are arranged side by side in up and down, which can effectively utilize a space. This can achieve downsizing of the saddle type vehicle 1.

The interlocking arm 31 is arranged below the lower link member 28. The interlocking arm 31 is arranged in one pair side by side in the left-right direction of the vehicle body 10. In the following description, the interlocking arm 31 arranged in the left side of the vehicle body may be referred to as a left interlocking arm 31L, and the interlocking arm 31 arranged in the right side of the vehicle body may be referred to as a right interlocking arm 31R. The right interlocking arm 31R is hidden by the other members in FIGS. 2 to 4, but drawn in FIG. 6.

Each of the left interlocking arm 31L and the right interlocking arm 31R is an elongated rod-like member made of metal, for example. Each of the left interlocking arm 31L and the right interlocking arm 31R is arranged so as to extend in the front-back direction. The left interlocking arm 31L and the right interlocking arm 31R are arranged parallel to each other.

A front end of the left interlocking arm 31L is rotatably supported to a front lower portion of the suspension link 34. A rear end of the left interlocking arm 31L is rotatably supported to a front lower portion of the vehicle body frame 15. Similarly, the right interlocking arm 31R is also connected to the suspension link 34 and the vehicle body frame 15.

The suspension link 34 is a link member having a substantially triangular shape as seen in the left-right direction of the vehicle body 10. A front upper portion of the suspension link 34 is rotatably supported to a lower portion of a rear end of the base part 23. The left interlocking arm 31L and the right interlocking arm 31R are rotatably connected to a front lower portion of the suspension link 34. The suspension link 34 extends rearward of a portion connecting to the base part 23 and a portion connecting to the interlocking arm 31. A lower end of the suspension unit 30 is rotatably connected to the rear end of the suspension link 34. A known pro-link mechanism for expanding the amount of expansion and contraction of the suspension unit 30 is constituted by combining the suspension link 34 and the interlocking airs 31.

In such configured saddle type vehicle 1, in the process of which the front supporting member 20 is moved up and down in arc motion with respect to the vehicle body frame 15, the suspension link 34 is moved together with the front supporting member 20. At the same time, the left interlocking arm 31L and the right interlocking arm 31R causes the suspension link 34 to be rotated. Therefore, the length of the suspension unit 30 for connecting the front upper portion of the vehicle body frame 15 and the rear end of the suspension link 34 is extended and contracted. Accordingly, a spring of the suspension unit 30 is expanded and contracted, and also damping force by the damper is applied. Thereby, the speed of which the front supporting member 20 is moved up and down with respect to the vehicle body frame 15 can be suppressed. As a result, shock and vibration to which the front wheels 11 receive from the road surface can be less likely to be transmitted from the front supporting member 20 to the vehicle body frame 15, etc. on the rear side.

The front wheels 11 are provided on each side in the left-right direction of the vehicle body 10 one by one. Each of the front wheels 11 is supported with respect to the vehicle body 10 (specifically, the front supporting unit 2) via the front wheel supporting structure 5. In the following description, in one pair of the front wheels 11, one front wheel 11 provided on the left side of the vehicle body 10 may be referred to as a left front wheel 11L, and the other front wheel 11 provided on the right side of the vehicle body 10 may be referred to as a right front wheel 11R. The left front wheel 11L corresponds to a first steering wheel, and the right front wheel 11R corresponds to a second steering wheel.

As shown in FIG. 2, the front wheel supporting structure 5 includes a pair of knuckle members 50, a pair of front wheel supporting members 6, an upper lean arm (first lean arm) 7, and a lower lean arm (second lean arm) 8.

In the following description, in the pair of knuckle members 50, one knuckle member 50 provided on the left side of the vehicle body 10 may be referred to as a left knuckle member 50L, and the other knuckle member 50 provided on the right side of the vehicle body 10 may be referred to as a right knuckle member 50R. The left knuckle member 50L corresponds to a first knuckle member, and the right knuckle member 50R corresponds to a second knuckle member.

In the pair of front wheel supporting members 6, one front wheel supporting member 6 provided on the left side of the vehicle body 10 may be referred to as a left front wheel supporting member 6L, and the other front wheel supporting member 6 provided on the right side of the vehicle body 10 may be referred to as a right front wheel supporting member 6R. The left front wheel supporting member 6L corresponds to a first steering wheel supporting member, and the right front wheel supporting member 6R corresponds to a second steering wheel supporting member.

FIG. 2 shows a state in which the left front wheel 11L and its surroundings (the left knuckle member 50L, a brake disc 19, and a brake caliper 17) have removed. In FIG. 3 and FIG. 4, the left front wheel 11L and its surroundings are omitted.

As shown in FIG. 2 etc., the knuckle member 50 rotatably supports one of the front wheels 11 via an axle 18 in left and right. The knuckle member 50 includes an axle support 51, a fixing part 53, and a push-pull part 52.

The axle support 51 having a cylindrical shape is arranged such that its axle faces the left-right direction. The axle 18 of each front wheel 11 is rotatably supported inside the axle support 51 via a bearing (not shown).

The fixing part 53 having a block shape is fixed to a rear portion on an outer peripheral surface of the axle support 51. The fixing part 53 is fixed to a body part 61 of the front wheel supporting member 6 via a fixing member (not shown, for example, a bolt). The details of the front wheel supporting member 6 will be described later.

The brake caliper 17 is mounted to the fixing part 53. A type of caliper which presses a brake pad by using hydraulic pressure may be used as the brake caliper 17. The brake caliper 17 brakes the front wheels 11 by friction generated by pressing the brake pad (not shown) against the brake disc 19.

As shown in FIG. 2, the push-pull part 52 is formed by an elongated plate member in the front-back direction. The push-pull part 52 is provided such that its thickness direction matches the left-right direction of the vehicle body 10. As seen in the left-right direction of the vehicle body 10, the push-pull part 52 is fixed to a front part of the outer peripheral surface of the axle support 51 so as to extend forward from the axle support 51. The push-pull part 52 is connected to an end of a steering rod 49 for constituting a steering link mechanism 46 which will be described later.

As seen in the left-right direction of the vehicle body 10, the fixing part 53 is arranged to extend from the axle support 51 to the rear opposite to the push-pull part 52. Therefore, the brake caliper 17 is positioned rearward of the axle 18 of the front wheel 11.

The front wheel supporting member 6 supports each front wheel 11 via the knuckle member 50 such that the front wheel 11 can be turned around a front wheel turning axis A1. The front wheel supporting member 6 includes the body part 61, mounting parts 62, and rotational axis members 63.

The body part 61 having a semicircular plate shape is arranged so as to circumvent the axle support 51 of the knuckle member 50. The fixing part 53 of the knuckle member 50 is fixed to the body part 61.

Each mounting part 62 is provided integrally with an upper end and a lower end of the body part 61 respectively. As shown in FIG. 2, etc., each mounting part 62 is bent in an L shape, as seen in the front-back direction of the vehicle body 10.

Each rotational axis member 63 is formed as an elongated rod-like member, and fixed to each mounting part 62 that is positioned in an upper part and a lower part of the front wheel supporting member 6. The upper rotational axis member 63 and the lower rotational axis member 63 are arranged such that each axis coincides with each other. Each axis is oriented to be inclined from the up-down direction, and the front is low and the rear is high as seen in the left-right direction of the vehicle body 10.

An upper end of the upper rotational axis member 63 is rotatably connected with respect to the upper lean arm 7. A lower end of the lower rotational axis member 63 is rotatably connected to the lower lean arm 8.

In the saddle type vehicle 1 of this embodiment, each front wheel 11 is supported so as to be turned around the axis of the two rotational axis members 63 provided in the front wheel supporting member 6. That is, the front wheel turning axis A1 coincides with the axis of the rotational axis member 63. In the following description, the front wheel turning axis A1 of the left front wheel 11L may be referred to as a left front wheel turning axis (first turning axis) A1L, and the front wheel turning axis A1 of the right front wheel 11R may be referred to as a right front wheel turning axis (second turning axis) A1R.

As shown in FIG. 5 etc., the upper lean arm 7 is rotatably provided on an upper side of the upper tip arm 24.

As shown in FIG. 5 etc., the upper lean arm 7 includes a first upper arm 71, a second upper arm 72, a third upper arm 73, a fourth upper arm 74, a first upper fulcrum boss 75, and a second upper fulcrum boss 76.

The first upper arm 71 and the second upper arm 72 are provided on the left front wheel 11L side. The first upper arm 71 and the second upper arm 72 are elongated so as to extend in a direction including left and right components in a plan view. The second upper arm 72 is positioned rearward of the first upper arm 71. Each left end of the first upper arm 71 and the second upper arm 72 is joined to each other. A portion where the left ends are joined is connected to an upper end of the left front wheel supporting member 6L via a first connecting part C1.

The first upper arm 71 and the second upper arm 72 are provided so as to be separated from each other in the front-back direction as separating from the first connecting part C1. In the first upper arm 71, one end opposite to the other end connected to the first connecting part C1 is connected to the first upper fulcrum boss 75. In the second upper arm 72, one end opposite to the other end connected to the first connecting part C1 is connected to the second upper fulcrum boss 76.

The third upper arm 73 and the fourth upper arm 74 are provided on the right front wheel 11R side. The third upper arm 73 and the fourth upper arm 74 are elongated so as to extend in a direction including left and right components in a plan view. The fourth upper arm 74 is positioned rearward of the third upper arm 73. Each right end of the third upper arm 73 and the fourth upper arm 74 are joined to each other. A portion where the right ends are joined is connected to an upper end of the right front wheel supporting member 6R via a second connecting part C2.

The third upper arm 73 and the fourth upper arm 74 are provided so as to be separated from each other in the front-back direction as separating from the second connecting part C2. In the third upper arm 73, one end opposite to the other end connected to the second connecting part C2 is connected to the first upper fulcrum boss 75. In the fourth upper arm 74, one end opposite to the other end connected to the second connecting part C2 is connected to the second upper fulcrum boss 76.

The first upper fulcrum boss 75 and the second upper fulcrum boss 76 are provided in a center of the upper lean arm 7, at a central position in the left-right direction of the saddle type vehicle 1 (that is, the central position between the two front wheels 11). In each of the first upper fulcrum boss 75 and the second upper fulcrum boss 76, its each axis has a cylindrical shape facing in the front-back direction, respectively. The first upper fulcrum boss 75 and the second upper fulcrum boss 76 are rotatably supported to the upper portion of the upper tip arm 24. The first upper fulcrum boss 75 and the second upper fulcrum boss 76 are arranged such that its each axis coincides with each other.

The first upper fulcrum boss 75 is provided forward of the second upper fulcrum boss 76. The first upper fulcrum boss 75 and the second upper fulcrum boss 76 are spaced from each other in the front-back direction.

The first upper fulcrum boss 75 is provided between the first upper arm 71 and the third upper arm 73. The first upper fulcrum boss 75 connects the first upper arm 71 and the third upper atm 73 to each other.

The second upper fulcrum boss 76 is provided between the second upper arm 72 and the fourth upper arm 74. The second upper fulcrum boss 76 connects the second upper arm 72 and the fourth upper arm 74 to each other.

Figure 6:
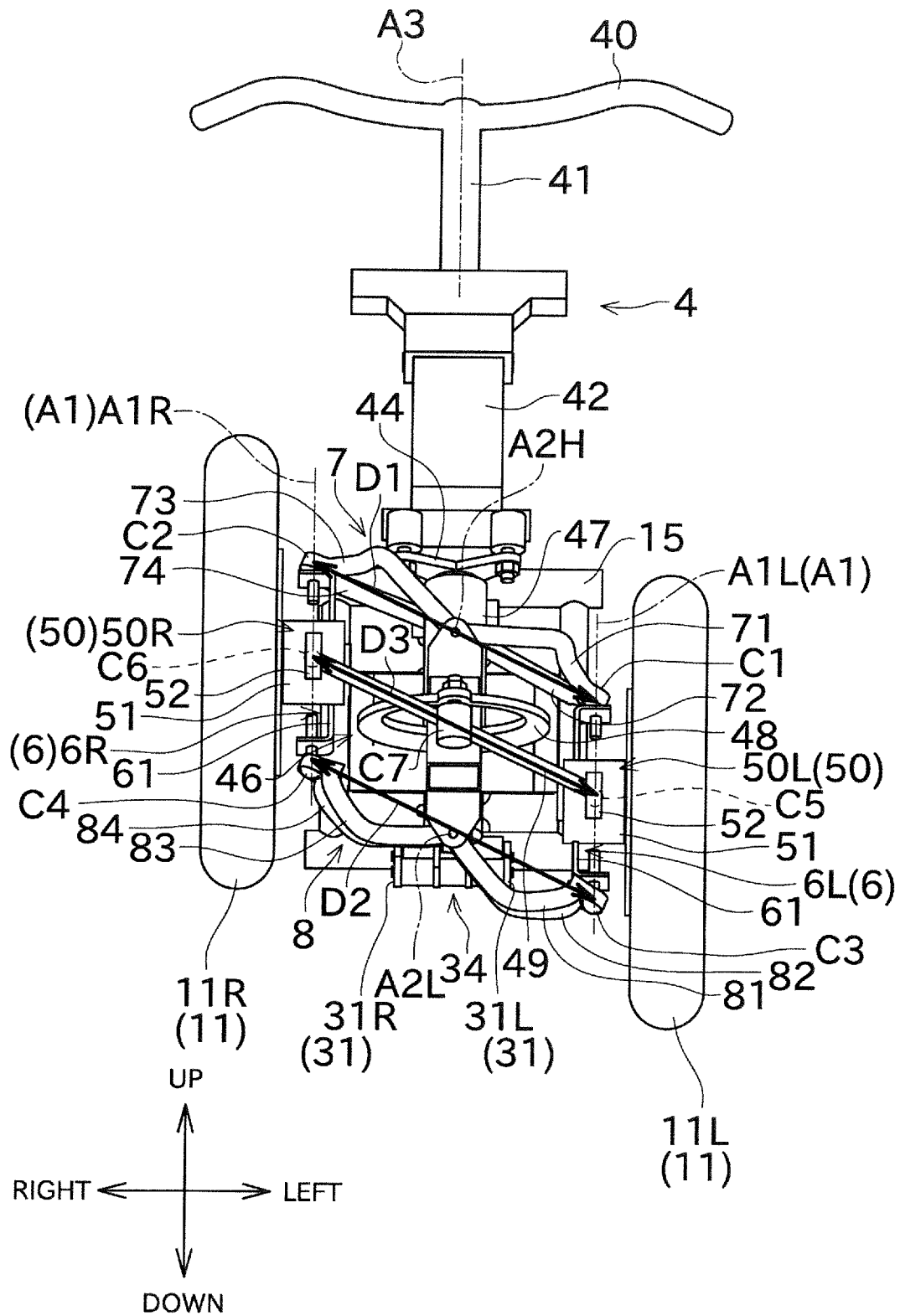
FIG. 6 is a partial front view showing a lean state.
Figure 7:
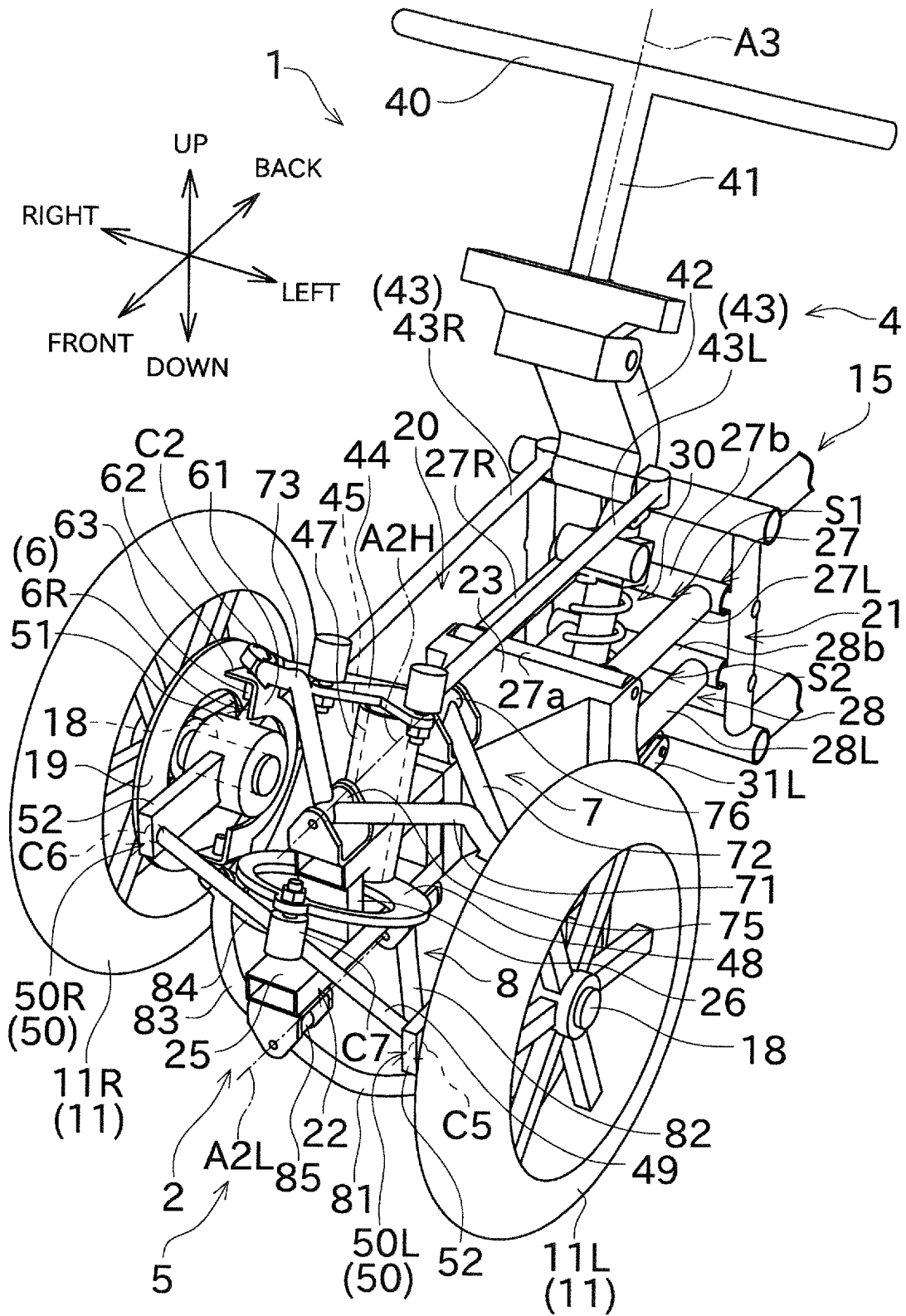
FIG. 7 is a partial perspective view showing the lean state.
Figure 8:
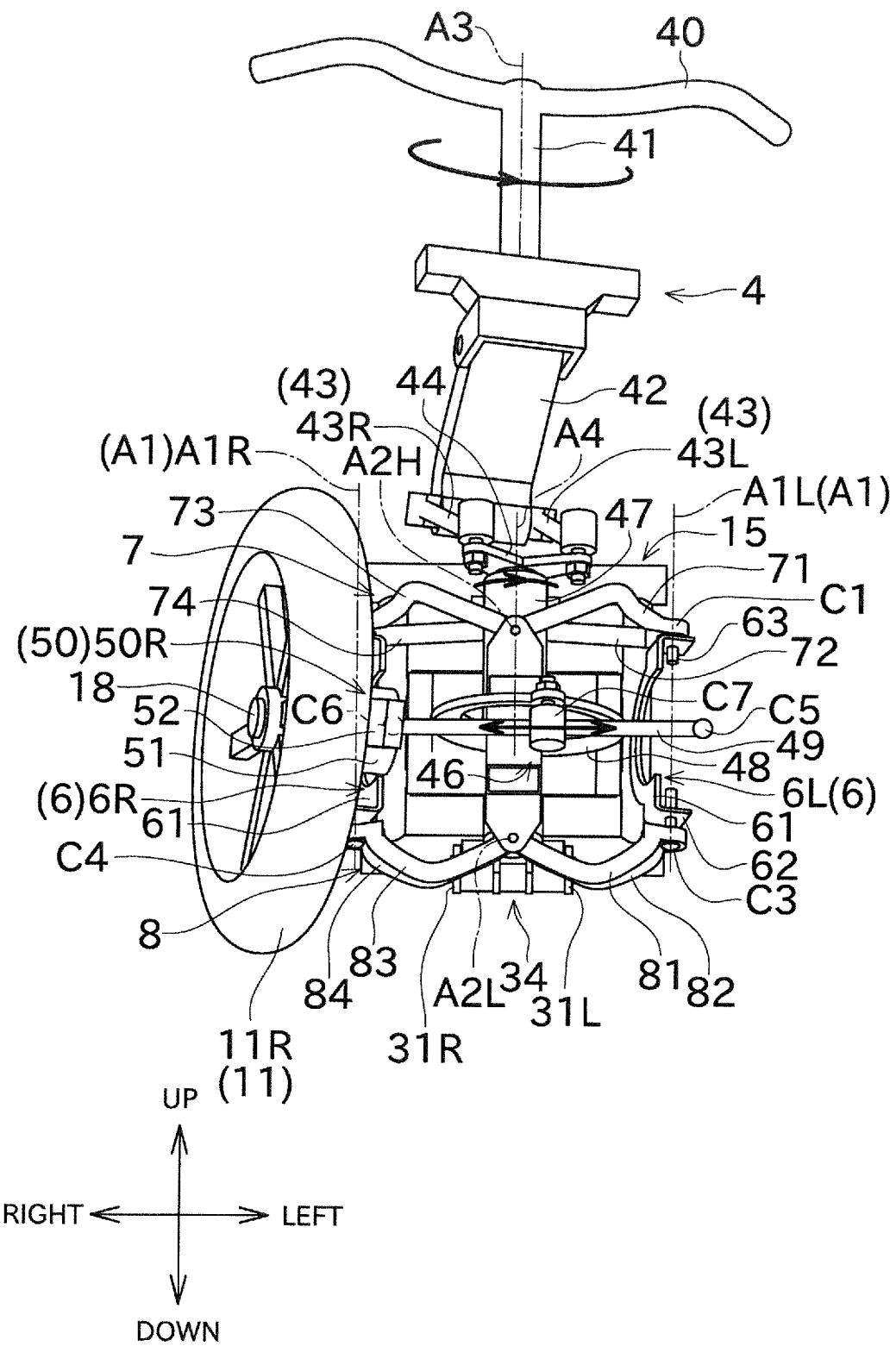
FIG. 8 is a partial front view showing a left turning state.
Figure 9:
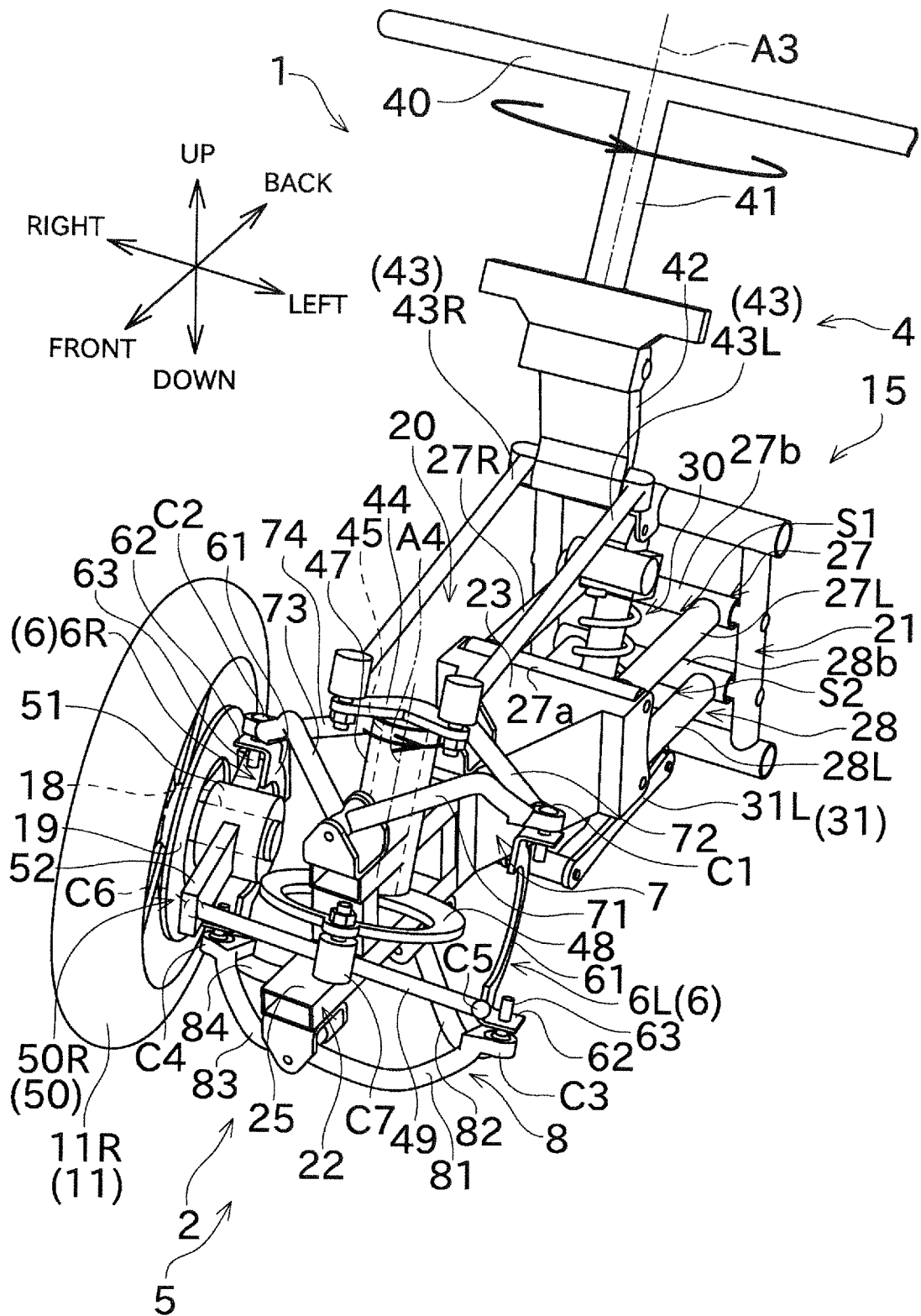
FIG. 9 is a partial perspective view showing the left turning state.

Such configured upper lean arm 7 has a rhombic shape in a plan view. A rhombic (rectangular) hollow space S3 is formed inside the upper lean arm 7. As shown in FIG. 6 and FIG. 7, the upper lean arm 7 is rotated in a seesaw manner, around an upper lean rotational axis A2H which coincides with each axis of the first upper fulcrum boss 75 and the second upper fulcrum boss 76.

As shown in FIG. 4 etc., the lower lean arm 8 is provided on a lower side of the lower tip arm 25. As shown in FIG. 4 and FIG. 5, the lower lean arm 8 includes a first lower arm 81, a second lower arm 82, a third lower arm 83, a fourth lower arm 84, a first lower fulcrum boss 85, and a second lower fulcrum boss 86.

Since each configuration of the first lower arm 81, the second lower arm 82, the third lower arm 83, the fourth lower arm 84, the first lower fulcrum boss 85 and the second lower fulcrum boss 86 of the lower lean arm 8 are similar to that of the first upper arm 71, the second the upper arm 72, the third upper arm 73, the fourth upper arm 74, the first upper fulcrum boss 75, and the second upper fulcrum boss 76 of the upper lean arm 7, detailed description will be omitted.

Each left end of the first lower arm 81 and the second lower arm 82 is joined to each other. A portion where the left ends are joined is connected to a lower end of the left front wheel supporting member 6L via a third connecting part C3.

Each right end of the third lower arm 83 and the fourth lower arm 84 is joined to each other. A portion where the right ends are joined is connected to a lower end of the right front wheel supporting member 6R via a fourth connecting part C4.

The first lower fulcrum boss 85 and the second lower fulcrum boss 86 are positioned in a center of the lower lean arm 8. In each of the first lower fulcrum boss 85 and the second lower fulcrum boss 86, its each axis has a cylindrical shape facing in the front-back direction. The first lower fulcrum boss 85 and the second lower fulcrum boss 86 are rotatably supported to the lower portion of the lower tip arm 25, respectively. The first lower fulcrum boss 85 and the second lower fulcrum boss 86 are arranged such that its each axis coincides with each other.

The first lower fulcrum boss 85 is provided forward of the second lower fulcrum boss 86. The first lower fulcrum boss 85 and the second lower fulcrum boss 86 are spaced from each other in the front-back direction. The first lower fulcrum boss 85 connects the first lower arm 81 and the third lower arm 83 to each other. The second lower fulcrum boss 86 connects the second lower arm 82 and the fourth lower arm 84 to each other.

Such configured lower lean arm 8 has a rhombic shape in a plan view. A rhombic (rectangular) hollow space S4 is formed inside the lower lean arm 8. As shown in FIG. 6 and FIG. 7, the lower lean arm 8 is rotated in a seesaw manner, around a lower lean rotational axis A2L which coincides with each axis of the first lower fulcrum boss 85 and the second lower fulcrum boss 86.

Summarizing the above, as shown in FIG. 2 etc., the left end of the upper lean arm 7 is connected to the rotational axis member 63 positioned to the upper part of the left front wheel supporting member 6L via the first connecting part C1, and the right end of the upper lean arm 7 is connected to the rotational axis member 63 positioned to the upper part of the right front wheel supporting member 6R via the second connecting part C2.

The left end of the lower lean arm 8 is connected to the rotational axis member 63 positioned to the lower part of the left front wheel supporting member 6L via the third connecting part C3. The right end of the lower lean arm 8 is connected to the rotational axis member 63 positioned to the lower part of the right front wheel supporting member 6R via the fourth connecting part C4.

The axis for connecting the first connecting part C1 and the third connecting part C3 constitutes the left front wheel turning axis A1L. The axis for connecting the second connecting part C2 and the fourth connecting part C4 constitutes the right front wheel turning axis A1R.

The first connecting part C1, the second connecting part C2, the third connecting part C3 and the fourth connecting part C4 are constituted by a spherical joint, for example. The spherical joint is a bearing with three degrees of freedom, and accepts rotation around the axis and inclination of the axis in the front-back and left-right direction. Accordingly, the front wheel supporting member 6 and the knuckle member 50 can be turned around the front wheel turning axis A1, and each angle formed by the upper lean arm 7 and the lower lean arm 8 and each angle formed by the left front wheel turning axis A1L and the right front wheel turning axis A1R can be arbitrarily changed.

In the above-described front wheel supporting structure 5, the left front wheel 11L and the right front wheel 11R are moved in opposite directions in the up-down direction, in conjunction with rotation of the upper lean arm 7 and the lower lean arm 8, as shown in FIG. 6 and FIG. 7. That is, by rotation of the upper lean arm 7 and the lower lean arm 8, the right front wheel 11R is lowered when the left front wheel 11L is raised, and the right front wheel 11R is raised when the left front wheel 11L is lowered. When one front wheel 11 is raised by a certain distance, the other front wheel 11 is lowered by the same distance. FIG. 6 and FIG. 7 shows a state in which the vehicle body 10 is upright for the purpose of clearly showing the difference in height between the left and right front wheels 11. However, actually, the vehicle body 10 is inclined against the road surface by the difference in height between the left and right front wheels 11. As such, in the saddle type vehicle 1 in this embodiment, a state in which the vehicle body 10 is inclined (a lean state) can be achieved with a simple configuration.

In this embodiment, the left front wheel 11L and the right front wheel 11R can be stably and easily moved up and down with respect to the front supporting member 20 via the upper lean arm 7 and the lower lean arm 8. That is, lean of the saddle type vehicle 1 can be easily achieved. Connection by using the above-described spherical joint makes it easy to realize turning in the lean state.

In the saddle type vehicle 1 of this embodiment, in FIG. 5, a distance D1 between the first connecting part C1 and the second connecting part C2 is equal to a distance D2 between the third connecting part C3 and the fourth connecting part C4 (D1=D2). In other words, each length of the upper lean arm 7 and the lower lean arm 8 in the left-right direction is equal to each other. Accordingly, in conjunction with rotation of the upper lean arm 7 and the lower lean arm 8, symmetry of up-down motion of the left front wheel 11L and the right front wheel 11R can be secured, and smooth lean of the saddle type vehicle 1 can be realized.

The upper lean rotational axis A2H that is a rotation center of the upper lean arm 7 is arranged to pass through each axis of the first upper fulcrum boss 75 and the second upper fulcrum boss 76. The lower lean rotational axis A2L that is a rotation center of the lower lean arm 8 is arranged to pass through each axis of the first lower fulcrum boss 85 and the second lower fulcrum boss 86. The upper lean rotational axis A2H is arranged to bisect the distance D1 between the first connecting part C1 and the second connecting part C2. The lower lean rotational axis A2L is arranged to bisect the distance D2 between the third connecting part C3 and the fourth connecting part C4.

Both the upper lean rotational axis A2H and the lower lean rotational axis A2L are oriented to the horizontal front-back direction. In other words, both the upper lean rotational axis A2H and the lower lean rotational axis A2L are perpendicular to the vehicle width direction.

As shown in FIG. 3 and FIG. 7, etc., the upper lean rotational axis A2H and the lower lean rotational axis A2L are provided in parallel with each other. Accordingly, in conjunction with rotation of the upper lean anti 7 and the lower lean arm 8, each end of the upper lean arm 7 and the lower lean arm 8 is moved with the same shape locus. Therefore, as seen in the front-back direction of the vehicle body 10, as shown in FIG. 6, the parallel link mechanism is constituted and the front wheels 11 can be stably moved up and down.

Since each of the upper lean arm 7 and the lower lean arm 8 is supported at two portions which are separated in the front-back direction, deviation of the upper lean rotational axis A2H and the lower lean rotational axis A2L can be easily reduced and smooth lean can be realized. The first upper fulcrum boss 75 for supporting the upper lean arm 7 on the front side and the first lower fulcrum boss 85 for supporting the lower lean at n 8 on the front side are arranged near a position where the upper tip arm 24 and the lower tip arm 25 are connected to each other by the joint part 26. Therefore, rigidity of the supporting portions of the upper lean arm 7 and the lower lean arm 8 can be increased.

Furthermore, as described above, since the spherical joint is adopted as a node of the link mechanism, an angle of inclination (that is, a caster angle) of the front wheel turning axis A1 can be easily adjusted by changing the angle of the rotational axis member 63 in the front wheel supporting member 6 as seen in the left-right direction of the vehicle body 10. Accordingly, the saddle type vehicle 1 of this embodiment can easily cope with both a case of pursuing a straight running performance for cruising performance or low fuel consumption and a case of pursuing a turning performance for sports. Then, the saddle type vehicle 1 has an excellent versatility.

Next, a configuration relating to steering of the saddle type vehicle 1 according to this embodiment will be described.

A steering mechanism 4 of the saddle type vehicle 1 of this embodiment includes a steering shaft 41, a joint member 42, a steering joint rod 43, a turning transmission member 44, a steering spindle 45, and a steering link mechanism 46, other than the above-described steering handle 40, as shown in FIG. 2.

The steering shaft 41 which extends in the direction including the upper and lower components, is provided with front-low and back-high inclination. The steering shaft 41 is supported by the vehicle body frame 15 via a head pipe (not shown). The upper end of the steering shaft 41 is fixed to the central portion of the steering handle 40, and the lower end is connected to the joint member 42. The steering handle 40 and the steering shaft 41 can be turned left and right around an operating axis A3 that is a center of the steering shaft 41.

As shown in FIG. 2, the joint member 42 is formed in a block shape having a predetermined width in the left-right direction. The joint member 42 is provided so as to extend rearward and downward from the steering shaft 41. The upper end of the joint member 42 is supported at the lower end of the steering shaft 41, so as to be rotated around the shaft in the horizontal direction. The lower end of the joint member 42 is connected to the steering joint rod 43.

The steering joint rod 43 is provided in pairs in left and right. In the following description, the steering joint rod 43 provided on the left side may be referred to as a left steering joint rod 43L, and the steering joint rod 43 provided on the right side may be referred to as a right steering joint rod 43R.

The left steering joint rod 43L and the right steering joint rod 43R are configured as elongated rod-like members in the front-back direction. Each rear end of the left steering joint rod 43L and the right steering joint rod 43R is connected to the left and right lower ends of the joint member 42 via the spherical joint, etc. Each front end of the left steering joint rod 43L and the right steering joint rod 43R is connected to the left and right sides of the turning transmission member 44 arranged at the upper portion of the front supporting member 20 via the spherical joint, etc.

The turning transmission member 44 that is a plate-like member is bent in a V-shape as seen in the up-down direction, however, this is not limited thereto. The turning transmission member 44 may have a U-shape or the like. The turning transmission member 44 is arranged above the front supporting member 20. A portion where the turning transmission member 44 is bent is fixed to the upper end of a steering spindle 45 which will be described later. Since the steering spindle 45 is rotatably supported with respect to the front supporting member 20, the turning transmission member 44 can be also rotated integrally with the steering spindle 45.

The turning transmission member 44 is formed so as to extend diagonally forward left and diagonally forward right from a bending portion to which the steering spindle 45 is attached. Each of the two ends of the turning transmission member 44 is rotatably connected to each front end of the left steering joint rod 43L and the right steering joint rod 43R.

The steering spindle 45 is rotatably supported with respect to the front supporting member 20 via a shaft case 47 fixed to the upper tip arm 24 of the front supporting member 20. The steering spindle 45 is arranged while being inserted in the shaft case 47. The steering spindle 45 can be rotated around its axis (a steering turning axis A4).

The steering turning axis A4 is oriented so as to be inclined from the up-down direction. The steering turning axis A4 is front-low and back-high, as seen in the left-right direction of the vehicle body 10.

As shown in FIG. 2, etc., the steering turning axis A4 is oriented parallel to the left front wheel turning axis A1L and the right front wheel turning axis A1R. Furthermore, in a state where the saddle type vehicle 1 goes straight and in a state where there is no height difference between the two front wheels 11, as seen in the left-right direction of the vehicle body 10 in FIG. 3, the steering turning axis A4, the left front wheel turning axis A1L, and the right front wheel turning axis A1R are overlapped with one another.

The shaft case 47 that is formed by a tubular member is arranged so that its shaft coincides with the steering turning axis A4. The shaft case 47 is fixed so as to intersect the intermediate portion of the upper tip arm 24. Accordingly, the front arm 22 of the front supporting unit 2 can be used to support the shaft case 47 (that is, the steering spindle 45). Thereby, the structure can be simplified.

The shaft case 47 is fixed to the upper tip arm 24, at a position between the first upper fulcrum boss 75 and the second upper fulcrum boss 76. That is, the shaft case 47 and the steering spindle 45 extend to pass through the hollow space S3 that is formed in the upper lean arm 7. The upper end of the steering spindle 45 is positioned above the upper lean rotational axis A2H, and the lower end of the steering spindle 45 is positioned between the upper lean rotational axis A2H and the lower lean rotational axis A2L. Accordingly, a space between the two front wheels 11 can be efficiently used, and the saddle type vehicle 1 can be made compact. The shaft case 47 is positioned rearward of the joint part 26 which connects the upper tip arm 24 and the lower tip arm 25. Thereby, the steering spindle 45 can be pivotably supported while securing rigidity of the front arm 22.

The steering link mechanism 46 includes a transmission arm (transmission member) 48 and the steering rod 49, and transmits rotation of the steering spindle 45 to the front wheels 11.

The transmission arm 48 that is a plate-like member is formed in a loop shape, specifically in a ring shape, as seen in the up-down direction, as shown in FIG. 5. An elliptical hollow space S5 extending in the left-right direction is formed inside the transmission arm 48. The joint part 26 passes through the hollow space S5 in the up-down direction. The rear of the transmission arm 48 is fixed to the lower end of the steering spindle 45, as shown in FIG. 3 etc. Therefore, the transmission arm 48 is rotated integrally with the steering spindle 45. The front of the transmission arm 48 is connected to the center of the steering rod 49 via a seventh connecting part C7.

The steering rod 49 that is constituted by an elongated rod-like member is arranged so as to connect the left and right knuckle members 50. The steering rod 49 is arranged between the upper lean arm 7 and the lower lean arm 8, as seen in in the front-back direction of the vehicle body 10 as shown in FIG. 6. A left end of the steering rod 49 is connected to the push-pull part 52 of the left knuckle member 50L via a fifth connecting part C5. A right end of the steering rod 49 is connected to the push-pull part 52 of the right knuckle member 50R via a sixth connecting part C6.

The steering rod 49 is provided forward of the steering spindle 45, as shown in FIG. 2 etc. The steering rod 49 is provided forward of the joint part 26 passing through the hollow space S5 of the transmission arm 48. Accordingly, the steering rod 49 can push and pull a portion that is positioned relatively forward of the knuckle member 50. This can easily turn the front wheels 11.

In the above-described configuration, when the driver performs rotation operation of the steering handle 40, the joint member 42 that is connected to the steering handle 40 via the steering shaft 41 is rotated around the operating axis A3. Accordingly, one of the left and right steering joint rods 43 is moved forward and the other is moved rearward. The pair of steering joint rods 43 is pushed and pulled, and thereby the turning transmission member 44 is rotated around the steering turning axis A4. As a result, the transmission arm 48 that is connected to the turning transmission member 44 via the steering spindle 45 is rotated.

The steering rod 49 that is connected to the front end of the transmission arm 48 is moved to the left-right direction, along with rotation of the transmission arm 48. Accordingly, since the push-pull part 52 of the knuckle member 50 is pushed (or pulled) in the left-right direction, the knuckle member 50 and the front wheel supporting member 6 are turned around the left front wheel turning axis A1L or the right front wheel turning axis A1R together with the front wheel 11. As above, steering based on the operation of the driver can be realized.

The fifth connecting part C5, the sixth connecting part C6, and the seventh connecting part C7 are constituted by the spherical joint, for example. Accordingly, when the saddle type vehicle 1 is leaned, the steering rod 49 can be positioned obliquely with respect to the front wheel 11, as shown in FIG. 6 and FIG. 7.

In FIG. 5, a distance D3 between the fifth connecting part C5 and the sixth connecting part C6 is equal to the distance D1 between the first connecting part C1 and the second connecting part C2, and also equal to the distance D2 between the third connecting part C3 and the fourth connecting part C4 (D3=D1=D2). In other words, a plane that is defined by three points of the first connecting part C1, the third connecting part C3 and the fifth connecting part C5 and a plane that is defined by three points of the second connecting part C2, the fourth connecting part C4 and the sixth connecting part C6 are parallel to each other. This can easily realize turning in a state where the saddle type vehicle 1 is leaned.

Each front end of the pair of steering joint rods 43 is connected to the turning transmission member 44 via the spherical joint. Each rear end of the pair of steering joint rods 43 is connected to the joint member 42 via the spherical joint. The joint member 42 is rotatably connected to the lower end of the steering shaft 41 around a horizontal shaft.

As a result, as shown in FIG. 3 and FIG. 4, even if the front supporting member 20 is swung up and down with respect to the vehicle body frame 15, the joint member 42 and the steering joint rod 43 can accordingly change the angle. Therefore, operation of which the driver has performed with the steering handle 40 can be properly transmitted to the turning transmission member 44 while absorbing a change in a positional relationship between the steering handle 40 and the turning transmission member 44.

In this embodiment, inclination of the vehicle body 10 is realized by different heights of the left and right front wheels 11 supported by the front supporting member 20, not by inclining the front supporting member 20 itself with respect to the vehicle body frame 15. Therefore, weight reduction of a mechanism for realizing lean can be realized.

A path (the turning transmission member 44, the steering spindle 45, the transmission arm 48, the steering link mechanism 46, etc.) for transmitting the driver's steering operation in the steering mechanism 4 is mechanically and clearly separated from a lean mechanism including the upper lean arm 7 and the lower lean arm 8. Therefore, since moment of inertia of a steering system can be reduced, good operability can be realized.

In the steering mechanism 4 of this embodiment, while the steering rod 49 is positioned forward of the axle of the front wheels 11, the brake caliper 17 which brakes the front wheels 11 is positioned rearward of the axle 18 of the front wheels 11. Accordingly, the steering rod 49 (and the push-pull part 52 of the knuckle member 50) and the brake caliper 17 can be arranged front and back, and a space can be used efficiently.

In this embodiment, the pair of steering joint rods 43 in left and right is almost parallel to each other as seen in the up-down direction in FIG. 5. However, a connecting position where the steering joint rods 43 are connected to the joint member 42 or the turning transmission member 44 can be also appropriately changed in the left-right direction, so that an interval between the steering joint rods 43 on the front end side is narrower or wider than that on the rear end side. For example, it is conceivable that a mounting hole is preformed at a position indicated by a broken line in the turning transmission member 44 of FIG. 5 and a connecting position of the front end of the steering joint rods 43 is changed to such mounting hole. The plurality of mounting holes is also formed on the joint member 42 side, which can select a connecting position of the rear end of the steering joint rod 43. This can change a steering feeling when the driver operates to turn the steering handle 40.

As described above, the saddle type vehicle 1 of this embodiment includes the left front wheel 11L, the right front wheel 11R, the left front wheel supporting member 6L, the right front wheel supporting member 6R, the upper lean arm 7, the lower lean arm 8, the steering spindle 45, the left knuckle member 50L, the right knuckle member 50R, and the steering link mechanism 46. The left front wheel 11L is rotatable. The right front wheel 11R is rotatable and arranged opposite to the left front wheel 11L in the vehicle width direction. The left front wheel supporting member 6L supports the right front wheel 11R. The right front wheel supporting member 6R supports the right front wheel 11R. In the upper lean arm 7, its center part is supported by the vehicle body 10, one side in the vehicle width direction is connected to the left front wheel supporting member 6L via the first connecting part C1, and the other side is connected to the right front wheel supporting member 6R via the second connecting part C2. The upper lean arm 7 is rotated around an (the upper lean rotational axis A2H) perpendicular to the vehicle width direction. In the lower lean arm 8, its center part is supported by the vehicle body 10 at a height different from that in the center part of the upper lean arm 7, one side in the vehicle width direction is connected to the left front wheel supporting member 6L via the third connecting part C3, and the other side is connected to the right front wheel supporting member 6R via the fourth connecting part C4. The lower lean arm 8 is rotated around an axis (the lower lean rotational axis A2L) perpendicular to the vehicle width direction. The steering spindle 45 is supported by the vehicle body 10 so as to be turned left and right around the steering turning axis A4. The left knuckle member 50L can be turned left and right around the left front wheel turning axis A1L connecting the first connecting part C1 and the third connecting part C3. The left knuckle member 50L is pushed and pulled to the vehicle width direction, and thereby the left front wheel 11L is turned left and right around the left front wheel turning axis A1L. The right knuckle member 50R can be turned left and right around the right front wheel turning axis A1R connecting the second connecting part C2 and the fourth connecting part C4. The right knuckle member 50R is pushed and pulled to the vehicle width direction, and thereby the right front wheel 11R is turned left and right around the right front wheel turning axis A1R. The steering link mechanism 46 pushes and pulls the left knuckle member 50L and the right knuckle member 50R to the vehicle width direction in conjunction with left and right turning of the steering spindle 45. The distance D1 between the first connecting part C1 and the second connecting part C2 is equal to the distance between the third connecting part C3 and the fourth connecting part C4 (D1=D2).

Accordingly, with combination of the steering link mechanism 46 and the lean arm 7 and the lower lean arm 8, lean and steering for interlocking the pair of front wheels 11 can be realized with a simple mechanism.

In a state where the saddle type vehicle 1 of this embodiment goes straight and a state where there is no height difference between the left front wheel 11L and the right front wheel 11R, as seen in a side view of the vehicle body 10 (FIG. 3), both the left front wheel turning axis A1L and the right front wheel turning axis A1R are overlapped with the steering turning axis A4.

Accordingly, when the saddle type vehicle 1 is leaned, the left front wheel 11L and the right front wheel 11R can be turned left and right in conjunction with the steering spindle 45.

The steering link mechanism 46 of this embodiment is connected to the left knuckle member 50L via the fifth connecting part C5, and connected to the right knuckle member 50R via the sixth connecting part C6. In a state where the saddle type vehicle 1 goes straight and a state where there is no height difference between the left front wheel 11L and the right front wheel 11R, the distance D3 between the fifth connecting part C5 and the sixth connecting part C6 in the vehicle width direction is equal to the distance D1 between the first connecting part C1 and the second connecting part. C2 in the vehicle width direction (D3=D1).

Accordingly, the left front wheel 11L and the right front wheel 11R can be turned left and right in the same direction and at the same angle.

In this embodiment, the steering link mechanism 46 includes the steering rod 49 and the transmission arm 48. The steering rod 49 is connected to the left knuckle member 50L via the fifth connecting part C5, and connected to the right knuckle member 50R via the sixth connecting part C6. The transmission arm 48 is rotated integrally with the steering spindle 45. An intermediate portion of the steering rod 49 is connected to the transmission arm 48 via the seventh connecting part C7.

Accordingly, a simple configuration can be realized.

In the saddle type vehicle 1 of this embodiment, the upper lean rotational axis A2H of the upper lean arm 7 and the lower lean rotational axis A2L of the lower lean arm 8 are parallel to each other.

Accordingly, smooth lean can be realized.

The saddle type vehicle 1 of this embodiment includes the front supporting member 20. The front supporting member 20 is arranged in the front part of the vehicle body 10. The front arm 22 of the front supporting member 20 is positioned between the front wheels 11, the left front wheel 11L and the right front wheel 11R. Both the upper lean arm 7 and the lower lean arm 8 are rotatably supported by the front arm 22 of the front supporting member 20.

Accordingly, the link mechanism with respect to the two front wheels 11 can be provided in the front of the vehicle body 10, at a relatively low position. This can improve stability of the vehicle body 10. Since the members such as a front fork is unnecessary, the weight of the vehicle body 10 can be reduced.

Figure 10:
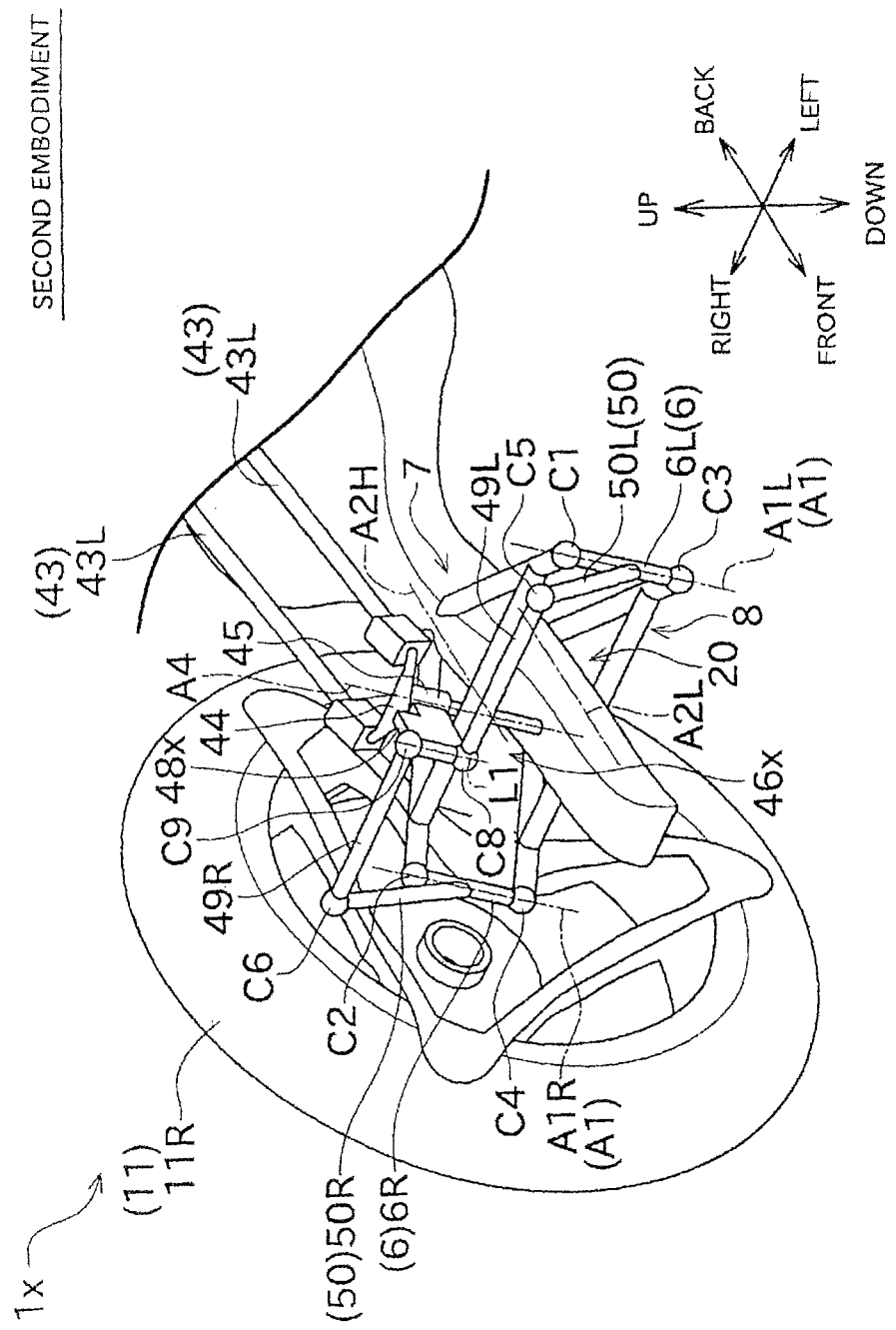
FIG. 10 is a partial perspective view showing a saddle type vehicle in a second embodiment.

Next, a second embodiment of the present invention will be described. FIG. 10 is a partial perspective view showing a saddle type vehicle 1x of the second embodiment. In the description this embodiment, members identical or similar to those of the above-described embodiment will be denoted by the same corresponding reference signs on the drawings, and a description thereof may be omitted.

A steering link mechanism 46x of the saddle type vehicle 1x of the second embodiment shown in FIG. 10 includes a left steering rod (first steering rod) 49L, a right steering rod (second steering rod) 49R and a transmission arm (steering arm) 48x. FIG. 10 shows a state where the left front wheel 11L is omitted.

In this embodiment, the upper lean arm 7 and the lower lean arm 8 have a substantially triangular shape, not a rhombic shape in the plan view. The upper lean arm 7 is rotatably arranged around the upper lean rotational axis A2H via a bearing (not shown). The lower lean arm 8 is rotatably arranged around the lower lean rotational axis A2L via the bearing (not shown).

The front wheel supporting member 6 is configured as an elongated rod-like member in the up-down direction. The upper end of the left front wheel supporting member 6L is connected to the upper lean arm 7 via the first connecting part C1, and the lower end is connected to the lower lean arm 8 via the third connecting part C3. The upper end of the right front wheel supporting member 6R is connected to the upper lean arm 7 via the second connecting part C2, and the lower end is connected to the lower lean arm 8 via the fourth connecting part C4.

The knuckle member 50 is fixed to an intermediate portion in the up-down direction of the front wheel supporting member 6. The knuckle member 50 is configured as an elongated rod-like member extending forward and upward from such fixed portion. Each tip of the left knuckle member 50L and the right knuckle member 50R is higher than the upper end of the front wheel supporting member 6.

Each tip height of the left knuckle member 50L and the right knuckle member 50R are different from each other. The left steering rod 49L is connected to the tip of the left knuckle member 50L, and the right steering rod 49R is connected to the tip of the right knuckle member 50R.

The steering spindle 45 having a cylindrical shape is rotatably supported by a support shaft projecting upward from the front supporting member 20. The transmission arm 48x is fixed to the front of the outer peripheral surface of the steering spindle 45. Therefore, the transmission arm 48x is rotated integrally with the steering spindle 45. Unlike the transmission arm 48 of the above-described first embodiment, the transmission arm 48x of this embodiment is arranged above the upper lean arm 7.

The transmission arm 48x is formed as a plate-like arm, and its thickness is oriented to the left-right direction. The left steering rod 49L is connected to the lower portion of the front end of the transmission arm 48x, and the right steering rod 49R is connected to the upper portion of the front end.

The left steering rod 49L is provided on the left front wheel 11L side. The left end of the left steering rod 49L is connected to the tip of the left knuckle member 50L via the fifth connecting part C5. In the left steering rod 49L, the end opposite to the end that is connected to the left knuckle member 50L is connected to a front lower portion of the transmission arm 48x via an eighth connecting part C8.

The right steering rod 49R is provide on the right front wheel 11R side. The right end of the right steering rod 49R is connected to the tip of the right knuckle member 50R via the sixth connecting part C6. In the right steering rod 49R, the end opposite to the end that is connected to the right knuckle member 50R is connected to the front upper portion of the transmission arm 48x via a ninth connecting part C9.

The eighth connecting part C8 and the ninth connecting part C9 can be configured as the spherical joint, for example. The left steering rod 49L and the right steering rod 49R are arranged parallel to each other. When considering a virtual straight line L1 connecting the eighth connecting part C8 and the ninth connecting part C9, the virtual straight line L1 is parallel to the steering turning axis A4.

Also in the saddle type vehicle 1x of this embodiment, the distance between the first connecting part C1 and the second connecting part C2 is equal to the distance between the third connecting part C3 and the fourth connecting part C4. The distance obtained by adding the distance between the fifth connecting part C5 and the eighth connecting part C8 and the distance between the sixth connecting part C6 and the ninth connecting part C9 is equal to the distance between the first connecting part C1 and the second connecting part C2.

As with the saddle type vehicle 1 of the above-described first embodiment, the saddle type vehicle 1x having this configuration can also realize lean and turning. A rod for steering can be equally divided left and right, and the left steering rod 49L and the right steering rod 49R have the different height. Therefore, flexibility of a layout in the steering link mechanism 46x can be enhanced.

As described above, the steering link mechanism 46x of the saddle type vehicle 1x of this embodiment includes the transmission arm 48x, the left steering rod 49L, and the right steering rod 49R. The transmission arm 48x is rotated integrally with the steering spindle 45. The left steering rod 49L is connected to the left knuckle member 50L via the fifth connecting part C5, and connected to the transmission arm 48 via the eighth connecting part C8. The right steering rod 49R is connected to the right knuckle member 50R via the sixth connecting part C6, and connected to the transmission arm 48 via the ninth connecting part C9. The virtual straight line L1 connecting the eighth connecting part C8 and the ninth connecting part C9 is parallel to the steering turning axis A4.

Accordingly, flexibility of a layout can be enhanced by dividing the steering rod in the vehicle width direction.

Although a preferred embodiment of the present invention has been described above, the above-described configuration can be modified, for example, as follows.

The upper lean rotational axis A2H and the lower lean rotational axis A2L can be also oriented to an inclined direction (in a front-low and back-high, or front-high and back-low), not in the horizontal front-back direction. Even in this case, the upper lean rotational axis A2H and the lower lean rotational axis A2L are oriented perpendicular to the vehicle width direction.

The connecting parts from the first connecting part C1 to the ninth connecting part C9 are not limited to the spherical joints, but other type of spherical sliding bearings can also be used. For example, the connecting parts with multiple degrees of freedom may be configured by combinations of radial bearings.

The configurations of the first embodiment and the second embodiment can also be applied to a lean/steering mechanism of each rear wheel in the saddle type vehicle having two rear wheels. In this case, in the rear supporting unit, not in the front supporting unit 2, the present invention is applied to a rear wheel supporting structure for supporting a pair of rear wheels in left and right. Then, orientation of front and back is reversed from the above-described description (the rear end side will be the front end side).

The invention claimed is:
1. A saddle vehicle, comprising:
a first rotatable steering wheel;
a second rotatable steering wheel arranged opposite to the first steering wheel in a vehicle width direction;
a first steering wheel supporting member supporting the first steering wheel;
a second steering wheel supporting member supporting the second steering wheel;
a first lean arm having a first center part that is supported by a vehicle body, the first lean arm in which a first side in the vehicle width direction is connected to the first steering wheel supporting member via a first connecting part and a second side is connected to the second steering wheel supporting member via a second connecting part, the first lean arm being rotated around an axis perpendicular to the vehicle width direction;
a second lean arm having a second center part that is supported by the vehicle body at a height different from that in the first center part, the second lean arm in which a third side in the vehicle width direction is connected to the first steering wheel supporting member via a third connecting part and a fourth side is connected to the second steering wheel supporting member via a fourth connecting part, the second lean arm being rotated around an axis perpendicular to the vehicle width direction;
a steering spindle supported by the vehicle body so as to be turned left and right around a steering turning axis;
a first knuckle member configured to be turned left and right around a first turning axis connecting the first connecting part and the third connecting part, the first knuckle member being pushed and pulled to the vehicle width direction and thereby causes the first steering wheel to be turned left and right around the first turning axis;
a second knuckle member configured to be turned left and right around a second turning axis connecting the second connecting part and the fourth connecting part, the second knuckle member being pushed and pulled to the vehicle width direction and thereby causes the second steering wheel to be turned left and right around the second turning axis; and a steering link mechanism pushing and pulling the first knuckle member and the second knuckle member to the vehicle width direction in conjunction with left and right turning of the steering spindle, wherein a distance between the first connecting part and the second connecting part is equal to a further distance between the third connecting part and the fourth connecting part, and wherein in a side view of the vehicle body, both the first turning axis and the second turning axis are overlapped with the steering turning axis, the steering turning axis being oriented parallel to the first turning axis and the second turning axis.

2. The saddle vehicle according to claim 1, wherein the steering link mechanism is connected to the first knuckle member via a fifth connecting part, and connected to the second knuckle member via a sixth connecting part and wherein in a first state when the saddle vehicle goes straight and in a second state when there is no height difference between the first steering wheel and the second steering wheel, the distance between the fifth connecting part and the sixth connecting part in the vehicle width direction is equal to the distance between the first connecting part and the second connecting part in the vehicle width direction.

3. The saddle vehicle according to claim 2, wherein the steering link mechanism includes:

a steering rod connected to the first knuckle member via the fifth connecting part, and connected to the second knuckle member via the sixth connecting part; and a transmission member rotated integrally with the steering spindle, and wherein an intermediate portion of the steering rod is connected to the transmission member via a seventh connecting part.

4. The saddle vehicle according to claim 2, wherein the steering link mechanism includes:

a steering arm rotated integrally with the steering spindle;

a first steering rod connected to the first knuckle member via the fifth connecting part, and connected to the steering arm via an eighth connecting part; and a second steering rod connected to the second knuckle member via the sixth connecting part, and connected to the steering arm via a ninth connecting part, and wherein a virtual straight line connecting the eighth connecting part and the ninth connecting part is parallel to the steering turning axis.

5. The saddle vehicle according to claim 1, wherein a rotational axis of the first lean arm and a rotational axis of the second lean arm are parallel to each other.

6. The saddle vehicle according to claim 1, further comprising:

a front supporting member arranged in a front part of the vehicle body, a front part of the front supporting member being positioned between the first steering wheel and the second steering wheel, wherein the first and second lean arms are rotatably supported at the front part of the front supporting member.

* * * * *